United States Patent
Olsen (10) Patent No.: US 8,213,088 B2
(45) Date of Patent: Jul. 3, 2012

(54) WIDE FIELD OF VIEW COLOR IMAGE PROJECTOR

(75) Inventor: Kjell Einar Olsen, Oslo (NO)

(73) Assignee: Projectiondesign AS, Gamle Fredrikstad (NO)

( * ) Notice: Subject to any disclaimer, the term of this patent is extended or adjusted under 35 U.S.C. 154(b) by 232 days.

(21) Appl. No.: 12/667,640

(22) PCT Filed: Jul. 1, 2008

(86) PCT No.: PCT/NO2008/000250
§ 371 (c)(1),
(2), (4) Date: Mar. 5, 2010

(87) PCT Pub. No.: WO2009/005369
PCT Pub. Date: Jan. 8, 2009

(65) Prior Publication Data
US 2010/0195211 A1    Aug. 5, 2010

(30) Foreign Application Priority Data
Jul. 5, 2007  (NO) .................................... 20073473

(51) Int. Cl.
*G02B 27/14* (2006.01)
(52) U.S. Cl. ........................................................ 359/634
(58) Field of Classification Search .................. 359/634, 359/721, 316; 353/34, 82; 348/757
See application file for complete search history.

(56) References Cited

U.S. PATENT DOCUMENTS

| 5,555,035 | A | 9/1996 | Mead et al. |
| 6,863,400 | B1 | 3/2005 | Liang |
| 2002/0149852 | A1 | 10/2002 | Dubinovsky et al. |
| 2006/0250581 | A1 * | 11/2006 | Silverstein et al. ............. 353/20 |
| 2007/0146880 | A1 | 6/2007 | Bleha et al. |
| 2007/0195275 | A1 | 8/2007 | Drazic et al. |
| 2008/0088800 | A1 | 4/2008 | Bellis et al. |

FOREIGN PATENT DOCUMENTS

| EP | 1 565 006 | 8/2005 |
| FR | 2 872 924 | 1/2006 |
| WO | 98/14828 | 4/1998 |
| WO | 2006/118905 | 11/2006 |

OTHER PUBLICATIONS

International Search Report dated Sep. 30, 2008, from corresponding PCT application.

* cited by examiner

*Primary Examiner* — Joseph P Martinez
(74) *Attorney, Agent, or Firm* — Young & Thompson (57) ABSTRACT

An optical device for an image projector for providing a projected wide field of view image, includes a first dichroic mirror or splitter, arranged in an input path for receiving light of a plurality of wavelength bands, and adapted to output by reflection on a first path respective first portions of selected ones of the wavelength bands and by transmission on a second path respective second portions of the selected ones of the wavelength bands. Light modulating devices, arranged in respective ones of the first and second paths to receive the first and second portions, generate and output on respective first and second intersecting output paths modulated ones of the first and second portions. A second dichroic mirror or combiner, adapted to reflect one and transmit the other of the first and second portions, is arranged in an area of intersection of the first and second intersecting output paths, to output, by reflection and transmission, respectively, the modulated ones of the first and second portions on a common output path.

14 Claims, 7 Drawing Sheets

FIG. 1

(PRIOR ART)

FIG. 8C

WIDE FIELD OF VIEW COLOR IMAGE PROJECTOR

FIELD OF THE INVENTION

The invention relates to an optical image projector, more specifically an electronic projector having an extended field of image projection wherein the image in the image plane is made by imaging several partial images generated by an apparatus having a plurality of light modulating devices.

BACKGROUND OF THE INVENTION

A wide range of different electronic projectors employ light modulating panels of different kinds to generate the image which by using lens optics is projected onto a screen. Currently the mostly used panels are of types LCD ("Liquid Crystal Display") or DMD ("Digital Modulating Device").

An LCD-panel is made of a number of light valves arranged side by side in a matrix, wherein each light valve is individually controllable and generates a point or image element, frequently referred to as a pixel, in an image assembled by the pixel light valves of the matrix. By controlling the light valve of each pixel to let through more or less light from a rewards located light source, seen from the direction in which the light flows from the light valve of the pixels, an image will be formed assembled by the pixels which let through light in mainly the same direction.

A DMD-panel is mainly generated by a number of tiltable micro mirrors, arranged side by side in a matrix, wherein each micro mirror is individually controllable and generates a point or a picture element, frequently referred to as a pixel, in an image consisting of a large number of such pixels. By controlling individually the mirrors of the various pixels to reflect light from a forward located light source in a particular direction, seen from the direction into which light is reflected, an image is generated assembled by the points that reflect light mainly in the same direction. The optical efficiency of a DMD-panel is frequently improved by combining the DMD-panel with a TIR-prism (total internal reflection prism).

By the commonly employed light source which emits light with a spatial distribution, such as for example an incandescent lamp or an arc lamp, which may include a kollimator, the light flowing from each pixel exhibits a divergence corresponding to the divergence of the light provided by the light source to the panel.

To project onto a screen the image generated by the light modulating panel, a lens is arranged in the path of the light exiting from the panel, such that light is collected, i.e. focused, in a plane of projection, which represents an imaging of the panel itself onto the screen.

Due to limitations in the production technology, light modulating panels are delivered in s different and limited matrix sizes and dimensions, preferably adapted to standardized picture formats that often are used in other image acquisition technology or screen technology. The available matrix sizes and dimension thus control the image resolution that by one single light modulating panel is achievable in a projected image. As an example, with a panel which includes 800 pixels horizontally and 600 pixels vertically, a projected image to fill a cinema screen having dimensions 4000 mm horizontally and 3000 mm vertically, would exhibit pixels that each measures 5 mm by 5 mm. For a viewer located close to the screen, such as for example a viewer located in one of the first rows in the movie theatre, each pixel will be clearly visible and would destroy the viewing experience of the picture being projected.

To obtain a better resolution, a plurality of panels are employed in an arrangement for their projection side by side in the projection plane as mosaic elements that together form the desired, projected image. With the movie theatre screen example mentioned above, an image mosaic obtained using a two by two panel arrangement of the same panel type indicated above, would require only one half of the image magnification in the projection optics, and would provide an image which exhibits pixels each having the dimensions 2.5 mm by 2.5 mm. In other words, thereby a reduction by a factor of two of the pixel size in the projected image is achieved, which may prove to be acceptable for use in a movie theatre.

In the technical field of electronic image projection a number of different solutions are know for generating a projected image that includes a mosaic of imagings of a plurality of light modulating panels. Known solutions employ partly reflecting mirrors or polarization dependent optical elements to deliver light from light sources or for combining light exiting from a number of light modulating devices to generate an image mosaic in the image projection plane.

The technical field of the invention particularly relates to electronic image projectors of a type that make use of a single lens for imaging a number of light modulating panels for creating the image mosaic, and which preferably also includes a single light source for providing light to the light modulating panels of the projector.

Figure 1:
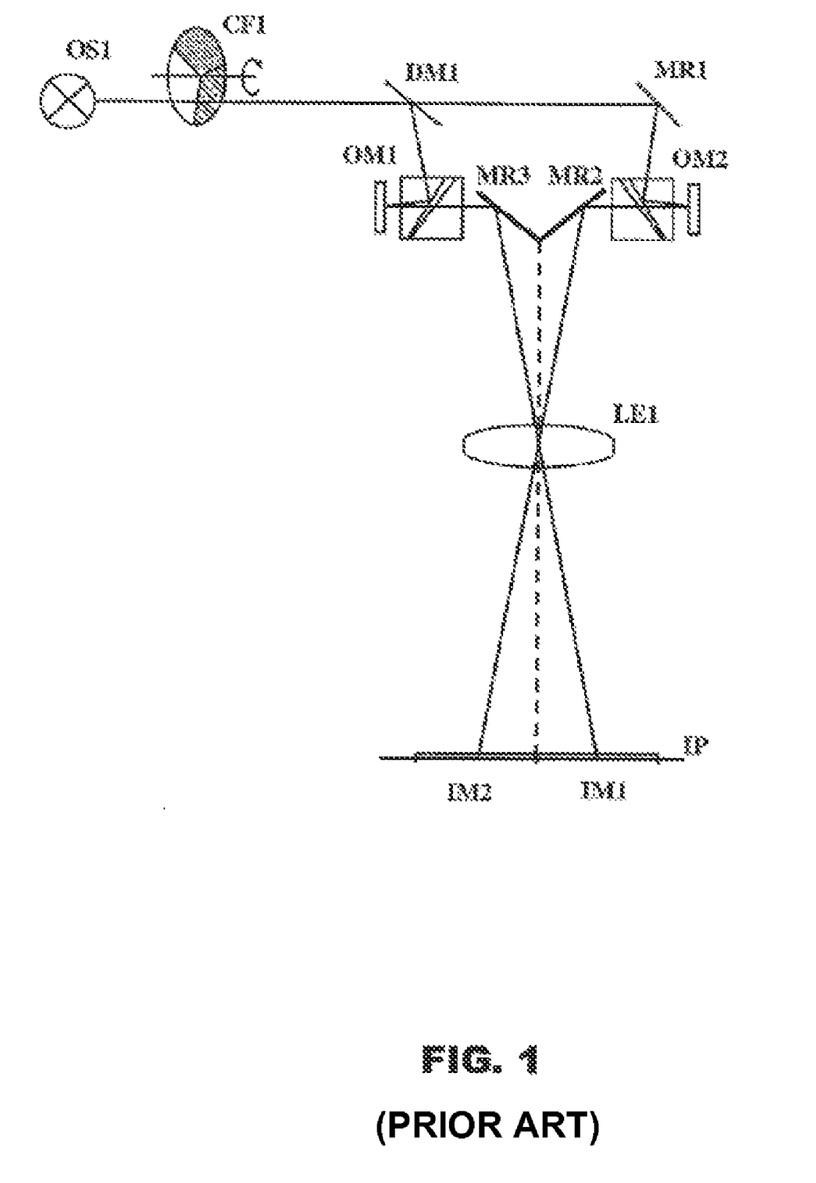
FIG. 1 illustrates a prior art solution for a projector of the type for generating a projected linage that includes a mosaic of imagings of a plurality of light modulating panels.

A solution for a projector of the type referred to in the section above, is illustrated using the example of the accompanying FIG. 1. A light source OS1 transmits a ray bundle in a direction towards the partly transmittive mirror DMS and the mirror MR1, which in turn each direct their part of the ray bundle towards each of their light modulating devices OM1 and OM2, respectively. The pixels of the light modulating devices OM1 and OM2 forward the light exiting from the devices in a direction by the deflection of mirrors MR3 and MR2, respectively, which control the outwards flowing light towards and through the imaging lens LE1 and forwards towards the image plane IP where images IM1 and IM2, respectively, are generated side by side, by the respective panels of the light modulating devices OM1 and OM2. To generate colour images, a rotating colour filter CF1 is used, which is synchronised with the controlling of the light modulating panels of the light modulating devices OM1 and OM2.

FIG. 1 also illustrates that the lights which flow from the light modulating devices is OM1 and OM2, respectively, to generate an image mosaic comprised of the respective image parts IM1 and IM2 that are located immediately adjacent to each other, would only partly fall onto the mirrors MR3 and MR2, respectively, where the mirrors come together with the optical central axes of the lens. Such an arrangement would require strict control of the design of the mirror combinations MR3, MR2, to avoid a visible transition in the imagings of IM1, IM2 in the image mosaic. Furthermore, due to the spreading of the light coming from the light modulating devices OM1 and OM2, a considerable part of the light that is to generate the respective parts of the images IM1 and IM2 that are located close to the transition, would pass below the mirrors MR3, MR2, and lead to a significant vignetting.

Figure 2:
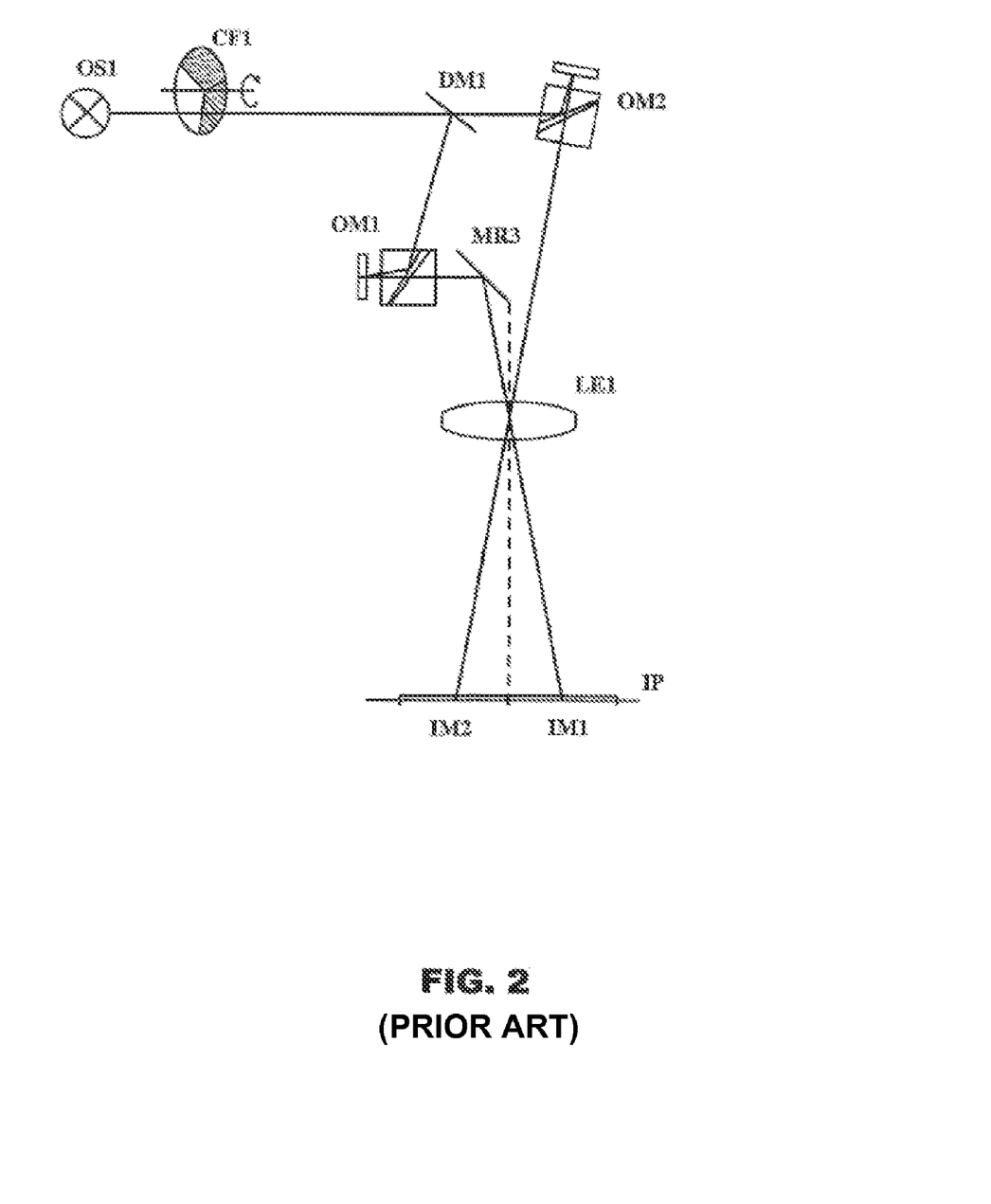
FIG. 2 illustrates an exemplary alternative solution in the prior art.

A corresponding problem is also present in a projector that is designed according to the exemplary alternative that is illustrated in FIG. 2.

A possible solution to the above mentioned problems of the transition between the mirrors MR3 and MR2, and also to the vignetting which in the accompanying FIGS. 1 and 2 in part is indicated by the broken line, is to image the mosaic elements IM1 and IM2 with some overlap, and to control in a special way those parts of the panels of the light modulating devices OM1 and OM2 that contribute to generating the images in the overlapping area. Such a solution is, however, complicated as the control of the panels of the light modulating devices OM1 and OM2 would have to be adapted individually and be maintained adjusted and controlled for each and every projector optics.

Figure 3:
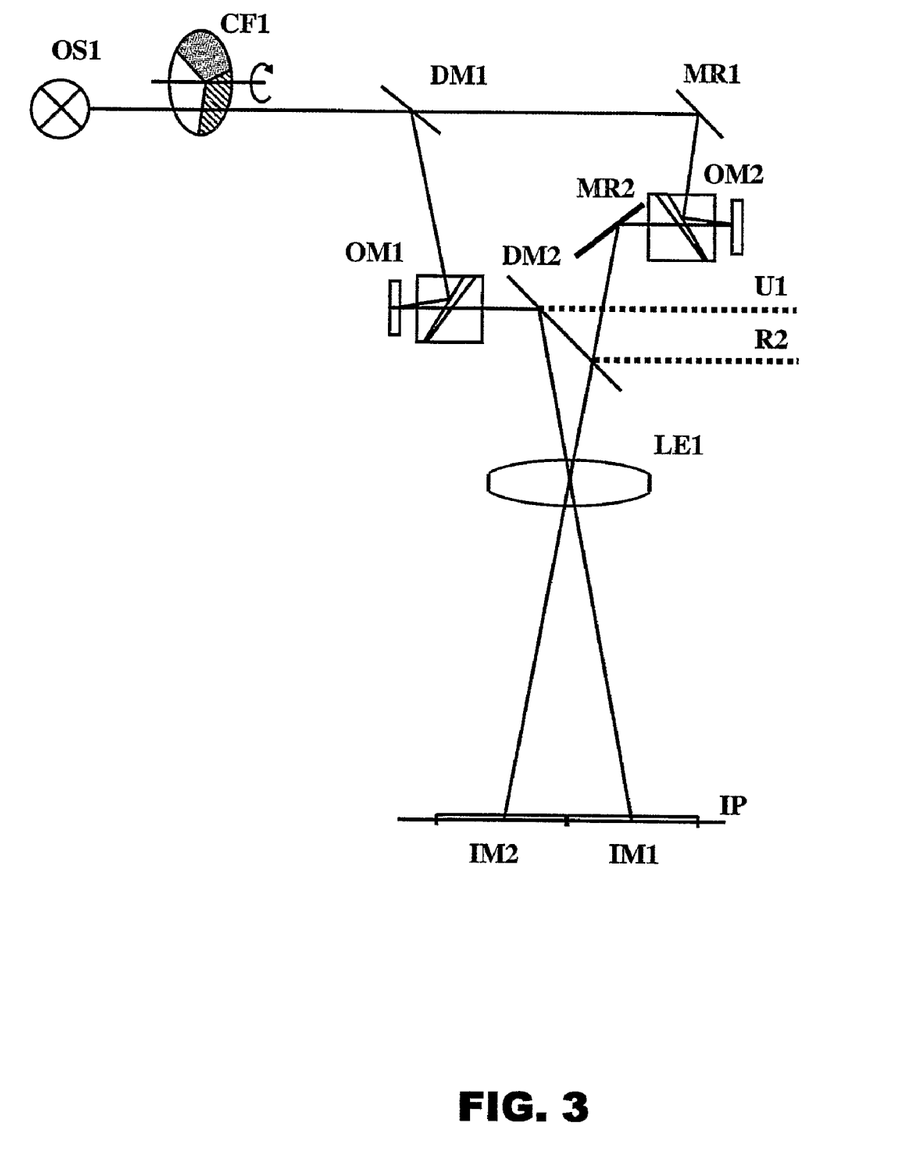
FIG. 3 illustrates a projector according to the present invention.

A further possible solution, which may be understood by studying the solution suggested in FIG. 3, is to replace the mirror MR3 that is included in FIGS. 1 and 2, with an ordinary partly reflective mirror DM2 without any selectivity with regard to the wavelength of the light. A disadvantage of this solution wherein DM2 is an ordinary partly reflective mirror or beam splitter without any wave length selectivity, is that DM2 introduces a loss of light, as light exiting from OM1 that in part will be coupled through DM2, cannot be transmitted towards the lens LE1, and light exiting from OM2 that only in part will be reflected by DM2 also will not be forwarded towards the lens LE1. The light loss from OM1 is illustrated by the broken line U1 and the light loss from OM2 is illustrated by the broken line R2.

SUMMARY OF THE INVENTION

According to the present invention, the above mentioned and other problems are solved by providing an optical image projector having a colour separating mirror or beam splitter that provides light to respective ones of several light modulating devices, colour combining mirrors or beam splitters that combine light from respective ones of the several light modulating devices, and an imaging optics arranges in the light parts of the combined light such that several light modulating devices are imaged side by side.

DETAILED DESCRIPTION OF THE INVENTION

Firstly, the invention is explained by the example being illustrated in FIG. 3.

The projector of the invention includes a light source OS1 and, possibly, its associated optics, adapted such that multicoloured light is directed to fall onto a dichroic, transmittive first mirror or beam splitter DM1. This dichroic, transmittive first mirror or beam splitter DM1 is adapted to split light, as energy in or more RF of the band of one or more selected colours M, Y, C generally is fully reflected and the energy of the other part T of the band of the selective colours generally is entirely transmitted (or, may be divided for the energy of further parts of the band, using a further splitter DM3).

Examples of DM-characteristics of a dichroic mirror or beam splitter for the inventions is shown schematically in the accompanying FIGS. 6, 7, 8A-C, illustrating that the dichroic, transmittive first mirror or beam splitter DM1 is adapted for dividing each colour into three band, designated herein by "low", "middle" and "high", respectively, such that central RF parts of the primary colour bands for "R", "G" and "B" are reflected in the band designated "middle", and the surrounding parts TR of each of the primary colour bands "R", "G" and "B" are transmitted in bands designated "low" and "high", or vice versa. By a subsequent combination of light that has been transmitted, or as an alternative, reflective, in the bands named "low" and "high", a colour coordinate is generated that corresponds to the colour coordinate of light in the band referred to as "middle". The relative distribution of reflectivity RF or transmittivity TR is in the FIGS. 6 and 7 somewhat different, and is meant to illustrate the principle differences between the mirror or beam splitter that is adapted for a solution employing two light modulating devices such as for example the solution illustrated in FIG. 4, and for a solution employing three light modulating devices such as for example the solution illustrated in FIG. 5, respectively. It should be noted that in the solution being illustrated in FIG. 4 having two light paths, one would preferably dimension DM1 in such a way that the total light energy in the two bands "low" and "high" corresponds to the light energy in the one band "middle". In comparison, for the solution illustrated in FIG. 5 wherein light is distributed onto three light paths, one would preferably design DM1 in such a way that the total light energy in the two bands "low" and "high" corresponds to one third of the light energy in the one band "middle", and furthermore dimension the splitter DM2 such that the reflective light energy corresponds to the is transmitted light energy. The aforementioned examples of dimensioning DM1, and possibly also of DM3, are from a colour combination perspective based on mainly equal contributions from, or possibly loss in, each of the respective light modulating devices, but the dimensioning could also be adapted to solutions wherein the contribution of the individual light modulating devices, or possibly also losses, are different. The characteristics of the dichroic mirror or beam splitter DM1, DM3 that are provided in the light path could advantageously also be dimensioned to take into consideration the energy distribution of the light from the light source being employed.

According to the present invention, the dichroic mirror or beam splitter could be dimensioned together with or in relation to the characteristics of the colour filter wheel and/or the characteristics of the light source, thereby achieving the desired colour space or other property with regard to colour, intensity or other optical properties of the mosaic images that are created in the image plane IP by use of a projector implementing the present invention.

Figure 8A:
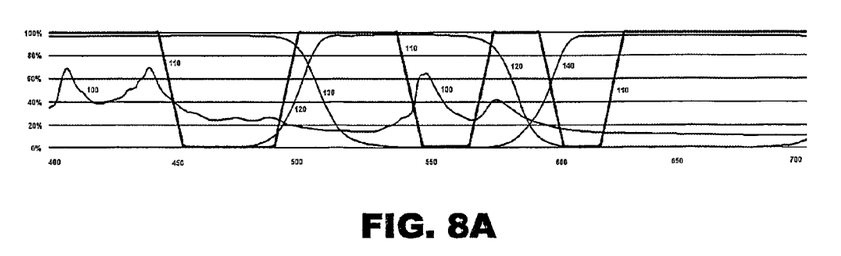
FIG. 8A illustrates exemplary characteristics of a light source by the curve labeled 100, of the colour wheel filters by the curves labelled 120, 130 and 140, and of an "ideal" dichroic mirror or beam splitter (DM1, DM2, DM3) by the curve labelled 110.

FIG. 8A provides exemplary characteristics of a light source by the curve labelled 100, of the colour wheel filters by the curves labelled 120, 130 and 140, and of an "ideal" dichroic mirror or beam splitter (DM1, DM2, DM3) by the curve labelled 110. The vertical axis indicates for filters and mirrors or beam splitters a characteristic value for their transmission, and for the light source a relative power characteristic value. In particular for the curve labelled 110 which exemplifies the characteristics of the "ideal" dichroic mirror for beam splitter DM1, DM2, and possibly also DM3, indicates in the vertical axis with a percentage that low transmittivity implies a correspondingly high reflectivity. The FIGS. 8B and 8C include a magnified version of those curves that are illustrated in FIG. 8A, and the vertical broken line indicates a common point of reference at about 550 nanometers along the horizontal axis for indication of the wave length.

Figure 6:
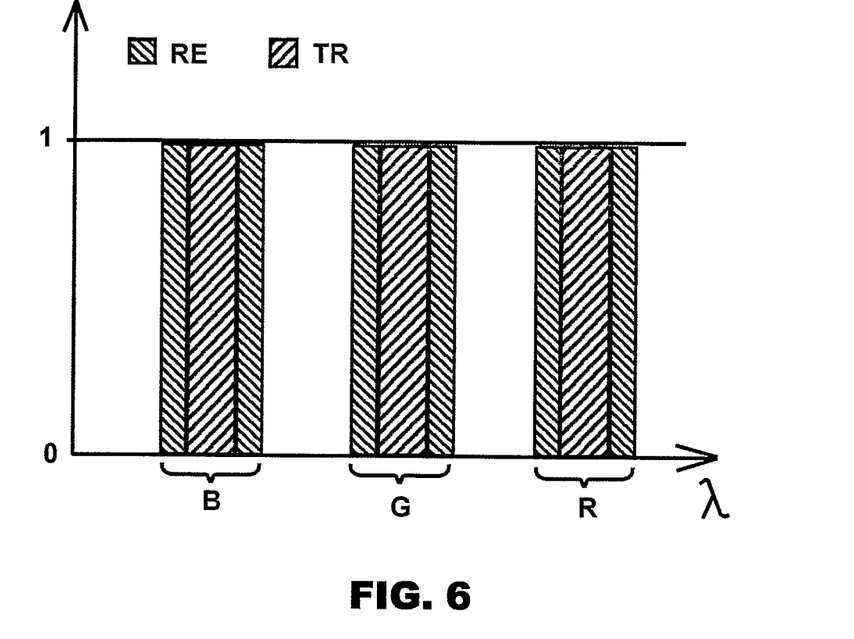
FIG. 6 illustrates the relative distribution of reflectivity RF and transmittivity TR of the primary colour bands that results from a dichroic mirror or beam splitter adapted for the invention shown in FIG. 4.
Figure 7:
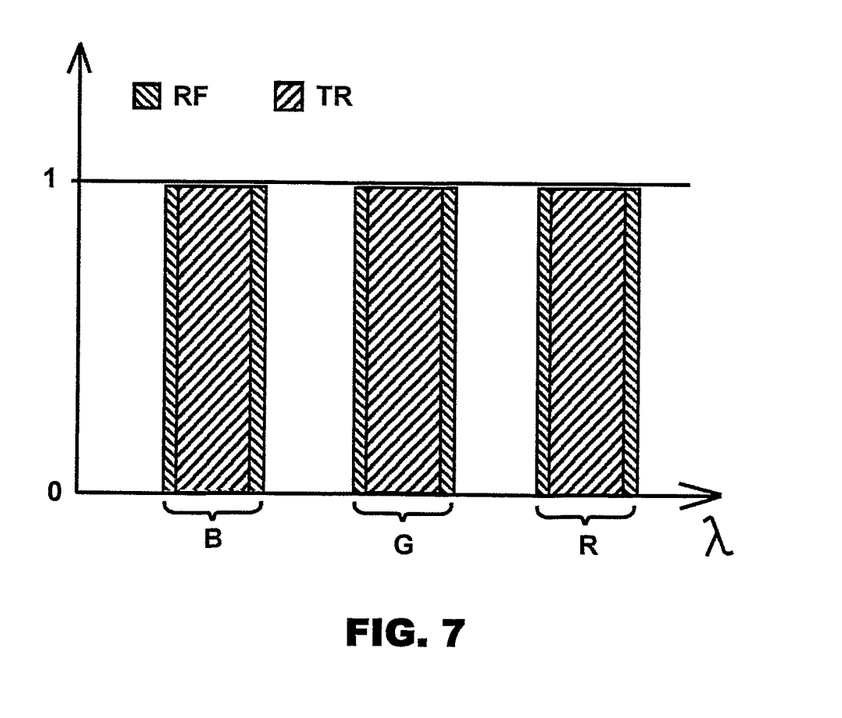
FIG. 7 illustrates the relative distribution of reflectivity RF and transmittivity TR of the primary colour bands that results from a dichroic mirror or beam splitter adapted for the invention shown in FIG. 5.
Figure 8B:
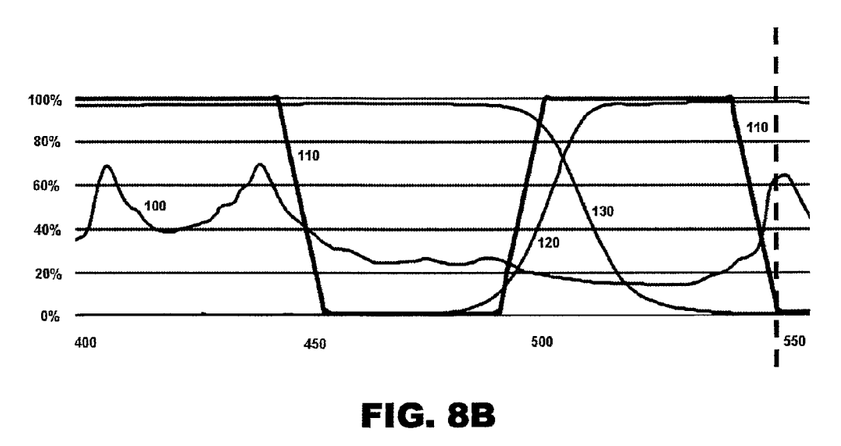
FIGS. 8B and 8C illustrate a magnified version of those curves that are illustrated in FIG. 8A, and the vertical broken line indicates a common point of reference.
Figure 8C:
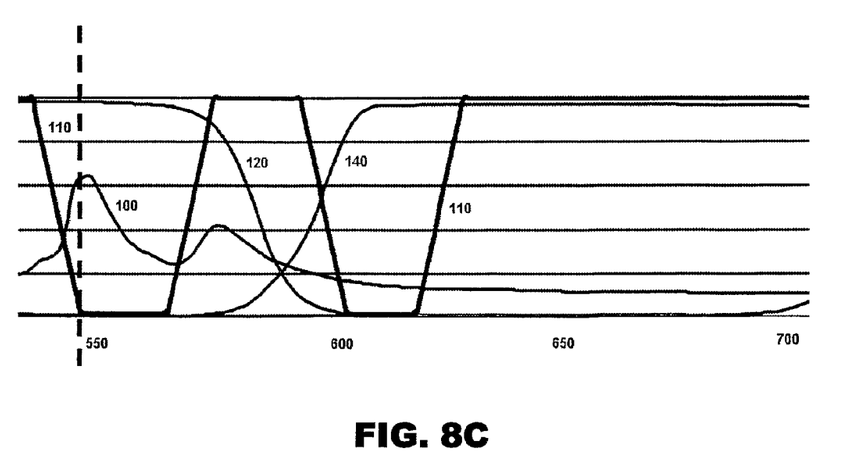

Of the exemplary characteristics being illustrated by FIGS. 8A, 8B and 8C, a skilled person in the art in the field of the present invention is taught that an advantageous total characteristic, corresponding to the "ideal" characteristics that are explained by reference to the principle examples that are illustrated in FIGS. 6 and 7, may be achieved by dimensioning the reflected, or the transmittive parts, respectively, of the characteristics of the dichroic mirror or beam splitter DM1, with regard to both the shape and widths of the "low", "middle" and "high" bands, and their positioning in relation to the respective ones of the characteristics of the filters of the wheel colour wheel and/or the characteristic of the light source. In this perspective, the objects of the present invention are achieved by an embodiment of the invention wherein the provision of light in one band "middle" and provision of light in both bands "low" and "high" for the respective, different light modulating devices are made through a preferable total characteristic achieved by a combination of the characteristics of the dichroic mirror or beam splitter DM1 and a further filter, as the further filter as an example preferably could be realised in one or more of the filters of the colour wheel CCF1.

In a projector according to the present invention as being illustrated by the example in FIG. 3, is including further optics adapted such that the light reflected from DM1 is directed into a first path to a first light modulating device OM1 located onto a first optical axis being displaced in relation to the optical axis of the focusing imaging lens LE1.

The projector of the invention further includes optics adapted such that the transmitted light T is provide into a second path towards a second light modulating device OM2 that is located onto a second optical axis, shifted with regard to the optical center axis of the focusing imaging lens LE1.

As indicated above, an embodiment of the invention may include one or more further light dividers, light combiners or light modulating devices, or possibly plurality of imaging optics devices, to generate a corresponding image into a common image field, which corresponding image then constitutes a partial image of an image comprised by the corresponding partial images generated each by a corresponding respective light modulating device. Such further splitters, combiners and light modulating devices are shown in the accompanying FIG. 5, wherein light is provided in a further third path to a third light modulating device OM3 located on a third optical axis shifted in relation to the optical axis that are decided by the locations of the first and second light modulating devices OM1 and OM2 in relation to a common imaging lens LE1.

A corresponding dichroic, transmittive second mirror or beam splitter DM2 is located in the area where the first and second paths of modulated light exiting from OM1 and OM2 (and possibly also the third path of modulated light exiting from OM3) intersect, and effects a combination of the modulated light from the light modulating devices as DM2 mainly provides a total reflection towards the lens LE1 of energy in the selected bands that were provided to OM1 and mainly in total transmits towards the lens LE1 the energy in the selected bands that were provided to OM2.

Figure 4:
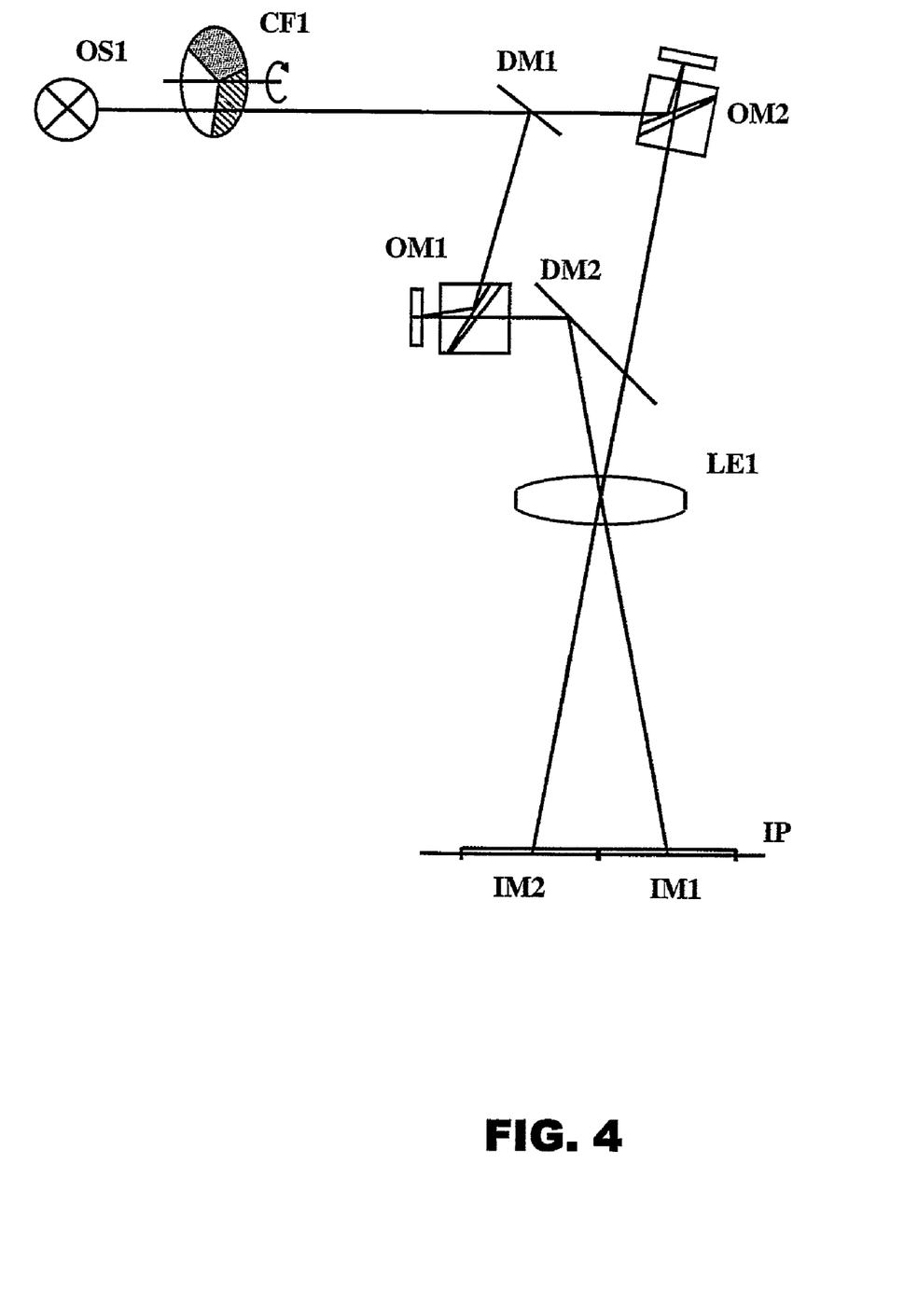
FIG. 4 illustrates a projector according to the present invention that employs two light modulating devices
Figure 5:
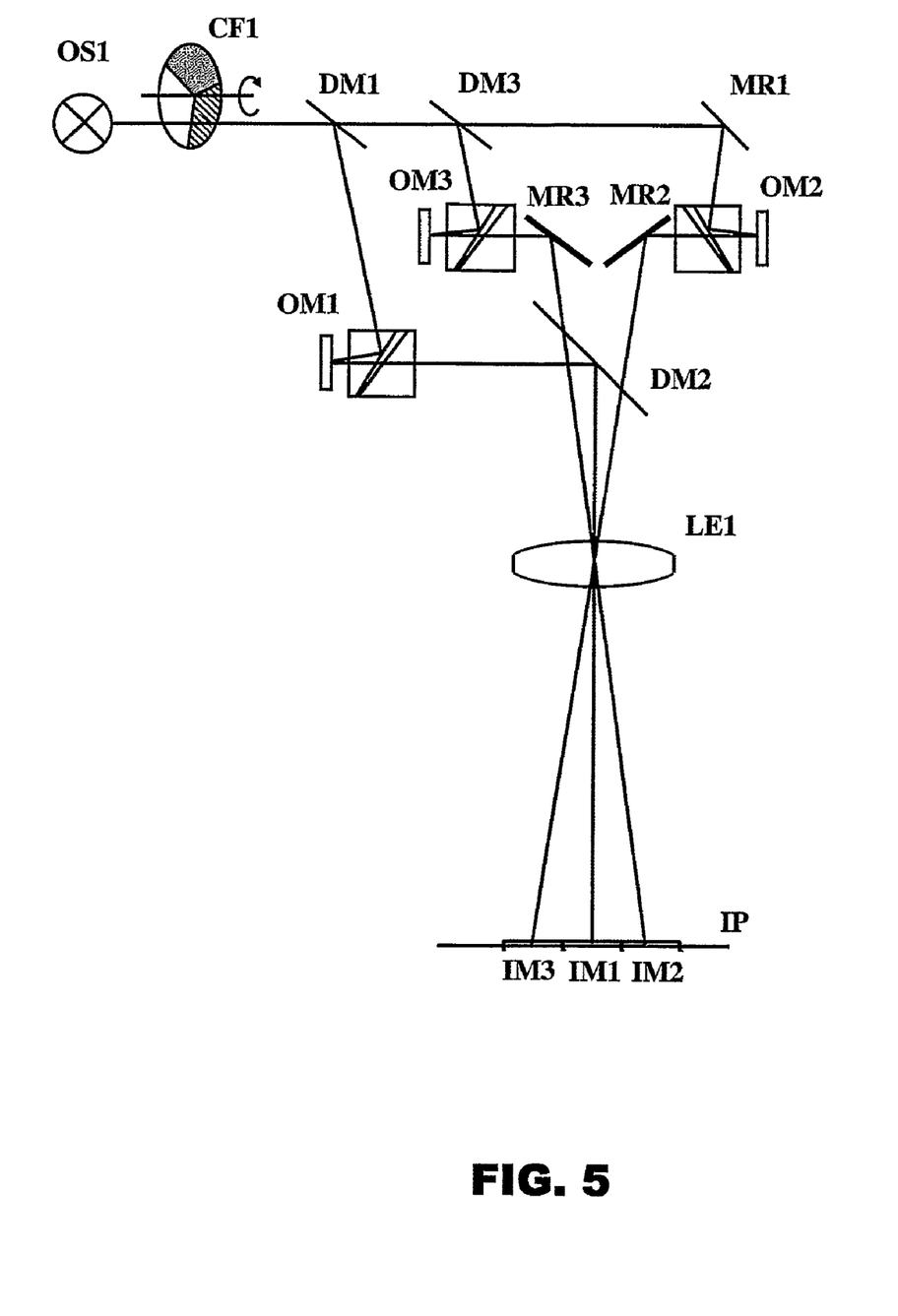
FIG. 5 illustrates a projector according to the present invention that employs three light modulating devices.

As the first and second, and possibly also the third, as illustrated in FIG. 5, light modulating devices are located on different optical axis in relation to the optical center axis of the focusing image creating lens, they are imaged in different places, preferably as partial images located side by side, in an image plane IP. FIG. 5 illustrates a solution including three light modulating devices, OM1, OM2 and OM3, respectively, which by their imaging through lens LE1 and possibly other optical elements, such as for example the mirrors MR2, MR3 and DM2, create an image mosaic that include three partial images IM1, IM2 and IM3 located side by side in the image plane IP. By a suitable selection of directions for two, possibly also three or more, axis, the light modulating devices are imaged side by side in the image plane, possibly with a complete or only partial overlap. The characteristics of the dichroic second mirror or beam splitter DM2 is preferably corresponding to or complementary to the characteristics of the dichroic first mirror or beam splitter DM1, depending on whether the image is to be generated on the first or second side of the outcoupling element that is illustrated as DM2 in FIGS. 3, 4 and 5.

In a variant of the solution disclosed above, other light modulating devices than the DMD is employed. As an example, LCD-panels may be used as the light modulating devices, that may be of a reflective or a transmitted type, with or without light polarizing elements in form of mirrors or prisms in the corresponding light paths.

The first and second, and possibly also the third, dichroic mirror or beam splitter may in a further variant be provided as dichroic filters, with or without the forms of mirrors, prisms or other optical elements for altering the direction of the beams, and may be selected in consequence of the locations of the further optical elements relative to each other. However, such combinations of dichroic filters and other optical additional elements should be selected such that one achieves both a distribution of light to the various light modulating devices, and a combination of light from the same light modulating devices, that in total provides the solution corresponding to the solution provided by the inventive principles of the solutions disclosed herein.

The use of dichroic mirrors or beam splitters for splitting the light at the input, and for collecting the light at the output, respectively, provides according to the present invention a generally loss less splitting and combination of light, as no light is lost in polarizing optics or by reflection or transmission into other directions by semi-transparent mirrors or beam splitters. At the same time, the number of optical surfaces to which or by which the light must pass from the light source to the image plane can be kept at a minimum.

In a variant of the solution of the invention, the arrangement of the optical elements are such that the partial images in the image plane provided by respective ones of the light modulating panels represent respective ones of images of an object as seen from different camera positions, such as typically is provided by a stereoscopic camera arrangement. In use for projection of a stereoscopic set of partial images, control signals corresponding to left and right images would then be provided to respective ones of the light modulating devices OM1 and OM2. For a viewer being suitably located with respect to the plane in which the partial images IM1 and IM2 are formed, where image separation for the eyes possibly may be obtained by the provision of shutter glasses or other means that allows the viewer to observe one of the partial images by one eye and the other of the partial images by the other eye, a 3D image experience may be provided. Considering an application of the arrangement of the invention for a 3D movie experience, the arrangement of the invention as illustrated in FIG. 3 or FIG. 4 could advantageously adapted for a multi viewer situation by allowing the partial images IM1 and IM2 to be formed in the same area of the image plane, while for a single viewer 3D viewing experience the partial images IM1 and IM2 could be formed in different parts of the image plane to allow 3D viewing by geometrical separation of the images for the right and left eyes, without necessitating the use of shutter glasses or similar means.

In case of an adaptation of the invention for providing a 3D viewing experience as disclosed in the paragraph above, with fully overlapping partial images IM1 and IM2 in the image plane IP, employment of the three path solution illustrated in FIG. 5 adapted to provide the third partial image IM3 in a fully overlapping constellation with the partial images IM1 and IM2 allows for an introduction of a further optical enhancement or augmentation of the total image formed by the partial images projected in the image plane IP.

The invention claimed is:

1. An optical device for an image projector, the device having an input path for receiving light of a plurality of different bands of wavelengths from a light source (0S1), the device comprising:
   a first dichroic mirror or splitter (DM1) arranged in said input path and being adapted to output
   a) by reflection onto a first path, a first portion of a first one of said different bands of wavelengths and a first portion of a second one of said different bands of wavelengths, and
   b) by transmission onto a second path, a second portion of said first one of said different bands of wavelengths and a second portion of said second one of said different bands of wavelengths, wherein said first and second portions are spectrally different,
   light modulating devices (OM1, 0M2) arranged in respective ones of said first and second paths to receive said first and second portions, and to generate and output on respective first and second intersecting output paths modulated ones of said first and second portions, and
   a second dichroic mirror or combiner (DM2), being adapted to reflect one and transmit the other of said first and second portions, and being arranged in an area of intersection of said first and second intersecting output paths to output, by reflection and transmission, said modulated ones of said first and second portions on a common output path.

2. The optical device for an image projector of claim 1; the first dichroic mirror being adapted to output
   a) by reflection onto said first path, a first portion of a third one of said different bands of wavelengths, and
   b) by transmission onto said second path, a second portion of said third one of said different bands of wavelengths.

3. The optical device for an image projector of claim 2; wherein each one of the first, second and the third different bands of wavelengths is one of a red (R) band, a green (G) band and a blue (B) band, or one of a yellow (Y) band, a magenta (M) band and a cyan (C) band.

4. The optical device for an image projector of claim 3; the second dichroic mirror having reflection and transmission characteristics corresponding substantially to the transmission and reflection characteristics, respectively, of the first dichroic mirror.

5. The optical device for an image projector of claim 3; the light modulating optics including first and second light modulating devices arranged in respective ones of said first and second paths.

6. The optical device for an image projector of claim 2; the second dichroic mirror having reflection and transmission characteristics corresponding substantially, or being complementary, to the reflection and transmission characteristics, respectively, of the first dichroic mirror.

7. The optical device for an image projector of claim 2; the second dichroic mirror having reflection and transmission characteristics corresponding substantially to the transmission and reflection characteristics, respectively, of the first dichroic mirror.

8. The optical device for an image projector of claim 2; the light modulating optics including first and second light modulating devices arranged in respective ones of said first and second paths.

9. The optical device for an image projector of claim 1; the second dichroic mirror having reflection and transmission characteristics corresponding substantially, or being complementary, to the reflection and transmission characteristics, respectively, of the first dichroic mirror.

10. The optical device for an image projector of claim 9; the second dichroic mirror having reflection and transmission characteristics corresponding substantially to the transmission and reflection characteristics, respectively, of the first dichroic mirror.

11. The optical device for an image projector of claim 1; the second dichroic mirror having reflection and transmission characteristics corresponding substantially to the transmission and reflection characteristics, respectively, of the first dichroic mirror.

12. The optical device for an image projector of claim 1; the light modulating optics including first and second light modulating devices arranged in respective ones of said first and second paths.

13. The optical device for an image projector of claim 1, wherein the optical device includes a focussing element, and the first and second paths representing different optical axis shifted differently with respect to the optical axis of the focussing element, to create images shifted with respect to each other in a common image plane of respective ones of the first and second light modulating devices.

14. The optical device for an image projector of claim 1; wherein the first and second paths represent different optical axis shifted differently with respect to the optical axis of the focussing element such that the light modulating devices are portrayed side-by-side in a projected image.

* * * * *